Figure 5:
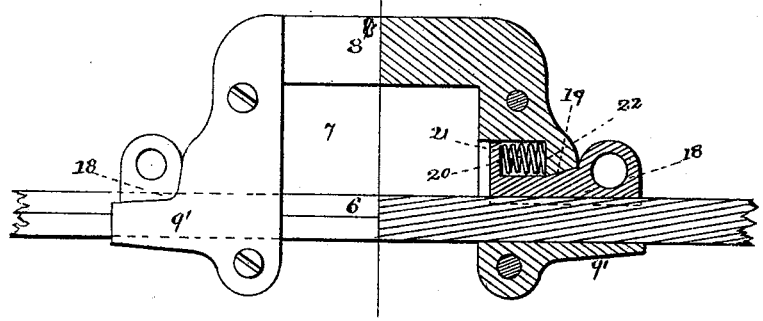

No. 627,491. Patented June 27, 1899.
G. F. EVANS.
BELT SHIFTING DEVICE.
(Application filed Feb. 20, 1899.)
(No Model.) 2 Sheets—Sheet 1.
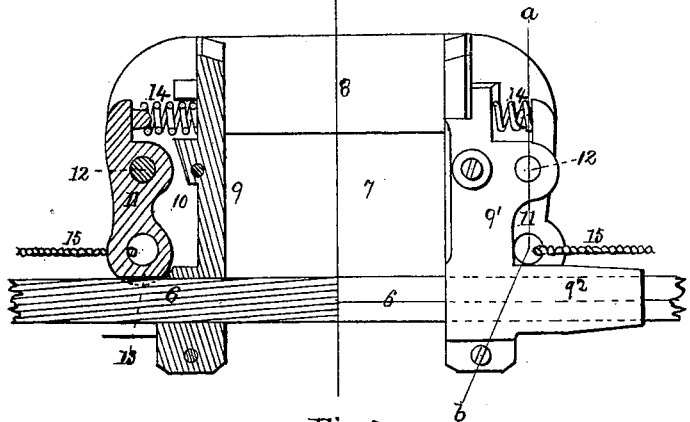
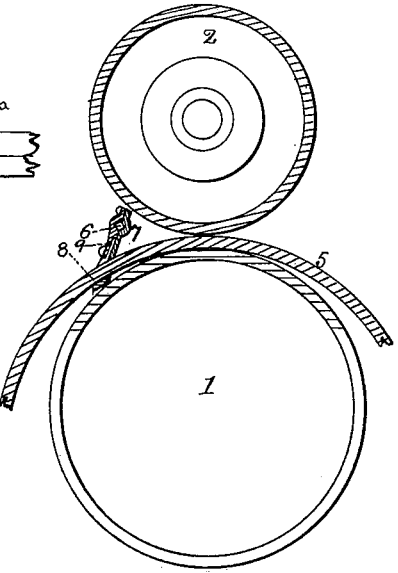
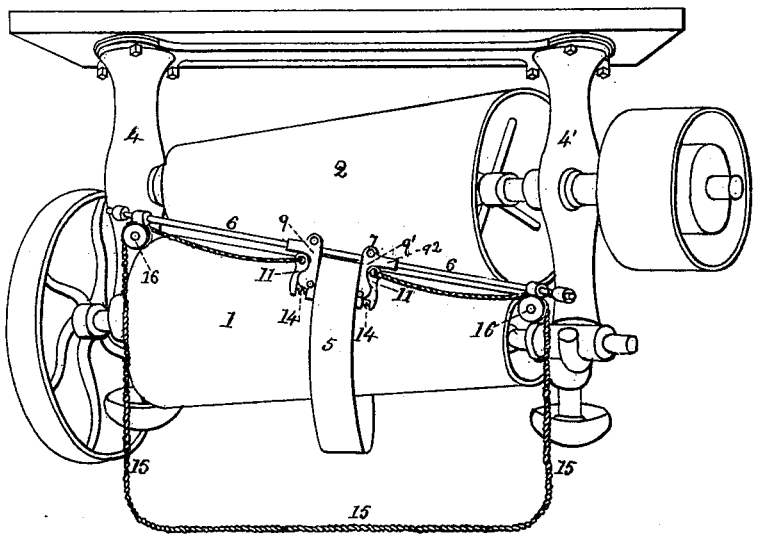
Witnesses.
Inventor.
George F. Evans
by Frederick Curtis, Atty.

No. 627,491.  
Patented June 27, 1899.

G. F. EVANS.  
BELT SHIFTING DEVICE.  
(Application filed Feb. 20, 1899.)

(No Model.)  
2 Sheets—Sheet 2.

Witnesses.  
Inventor.  
George F. Evans.  
by Frederick Curtis. Atty.

THE NORRIS PETERS CO., PHOTO-LITHO., WASHINGTON, D. C.

UNITED STATES PATENT OFFICE.

GEORGE F. EVANS, OF BOSTON, MASSACHUSETTS.

BELT-SHIFTING DEVICE.

SPECIFICATION forming part of Letters Patent No. 627,491, dated June 27, 1899.

Application filed February 20, 1899. Serial No. 706,147. (No model.)

*To all whom it may concern:*

Be it known that I, GEORGE F. EVANS, a citizen of the United States, residing at Boston, in the county of Suffolk and Commonwealth of Massachusetts, have invented a new and useful Improvement in Belt-Shifting Devices, of which the following is a specification.

This invention relates to a manner of transmitting motion from one cone-pulley to another without arresting the motion of either, in which a pair of reversely-tapering cones are placed in close proximity to but free from contact with one another, and the employment, in combination with such pulleys, of an endless driving-belt loosely encircling one pulley and traveling between the two, the frictional pressure or contact of the said pulleys upon this belt serving to transmit motion from one to the other of the former, mechanical means being combined with the belt and pulleys, where the distance between the latter may be varied, to compensate for the diminishing thickness of the belt during use, as well as means by which the belt may be shifted in position along the pulleys to vary the speed transmitted from the driver to the driven one.

A notable instance of the class of cone-pulley propulsion to which my present invention relates may be seen in Letters Patent of the United States numbered 299,231, issued on the 27th day of May, 1884, to Wesley E. Laird, and also in Letters Patent of the United States numbered 374,296 and 390,216, respectively, and issued to myself on the 6th day of December, 1887, and the 2d day of October, 1888.

My invention has reference to the mechanism for shifting the position of the driving-belt along the pulleys, its purpose being mainly to enable the operator to effect considerable changes in the position of the belt rapidly and easily and to provide means for locking the belt-shaft when at rest immovably to its support. In the Laird patent before quoted this belt is shifted or adjusted by means of a movable carrier or shifter which, accordingly as it is moved toward the larger or smaller ends of the driving-pulley—that is, the one encircled by the belt—will shift the belt and accelerate or diminish the speed of the driven pulley, said shifter being controlled and actuated by means of a windlass-shaft and cord, said cord being suitably secured at opposite ends to such windlass and passing about pulleys pivoted to the machine-housings, the remaining ends of the cord being secured to opposite sides of the shifter in such manner that, according to the direction in which the windlass is turned, the belt will by means of the cord be shifted toward the larger or smaller ends of the driving-pulley. In this manner of shifting the belt the stretching of the cord prevents to a considerable extent one very desirable result—namely, a uniform and constant speed of the counter-shaft. In my two patents above quoted I have endeavored to provide against this objection by the employment of a screw-threaded shaft which extends through the shifter and lengthwise of the pulleys and is mounted in bearings in the housings or hangers of the machine. In these two latter instances the mechanism employed for actuating the belt-shifter (or "shipper," as it is commonly termed) is slow in action, and the purpose of my present invention is to effect three results: First, to provide suitable mechanism for rapidly shifting the position of the belt to any given extent upon the driving-pulley, whereby the operator may by simply pulling a loosely-hanging cord or chain situated closely to his hand be able to effect both the release and moving of the belt-shifting device, and consequently of the belt, said shifter while at rest being locked firmly and immovably to its support; second, to so construct the belt shifter or carrier that it shall when in its inactive or normal position be locked directly and immovably to its support, and, third, to so construct the belt-shipper that when released from the pull upon the cord it shall automatically lock itself rigidly to its support. To effect these objects, I employ in place of the windlass and cord and the screw-threaded shaft for actuating the shifter a stationary rigid rod or bar, which extends lengthwise of and practically parallel with the adjacent surfaces of the pulleys and is secured at its opposite ends in bearings in the housings or hangers of the machine. The belt-shifter is a carriage which embraces the belt and is mounted upon and capable of sliding to and fro on the rod and is controlled and actuated by means of a loosely-hanging cord; the ends of which are secured, respectively, to opposite sides of the said carriage. The ends of the cord in lieu of being connected directly to the carriage are secured, respectively, to spring-actuated twin cam-levers pivoted to opposite sides of said carriage and operating with and gripping the rod in such manner that a pull upon the cord results in releasing the hold of the carriage upon the rod and permits such carriage to be pulled upon the rod in either direction, while upon releasing the cord the levers by the action of their springs are caused to firmly grip the rod and hold the carriage firmly in place thereupon.

Figure 6:
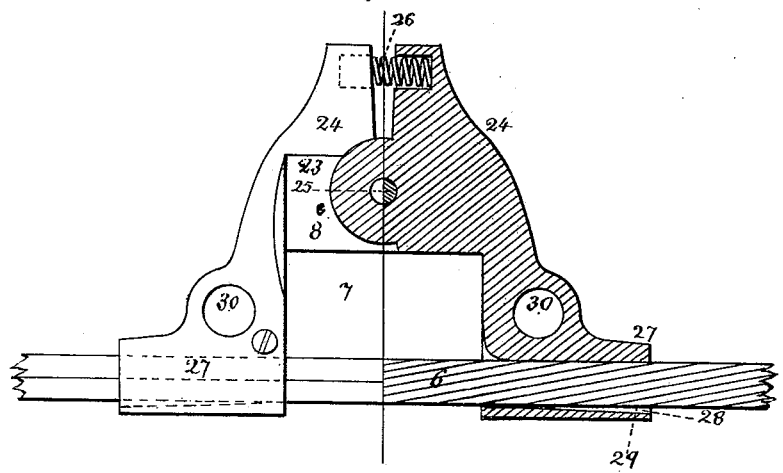

The drawings accompanying this specification represent in Figure 1 a perspective view of a pair of cone-pulleys and their supports provided with my improvements. Fig. 2 is a sectional plan, on an enlarged scale, of the belt-shifter. Fig. 3 is a section, also on an enlarged scale, of the belt-shifter, while Fig. 4 is a cross-section, enlarged, of the two cones, the endless belt, and the belt-shifter. Figs. 5 and 6 in the drawings represent modifications (to be hereinafter described) of the device for releasing the belt-shifter.

In the drawings, 1 2 represent a pair of reversely-tapering cone-pulleys arranged in close proximity to but free from contact with one another, the space between them being such as to receive with a tight grip the endless belt which travels between them, the journals of these cone-pulleys being mounted in bearings in the housings of the machine-frame, these housings (or hangers, as the case may be) being shown, respectively, at 4 4'.

The endless driving-belt is shown at 5 as loosely encircling the driving-pulley 1 and traveling between and tightly gripped by the two pulleys, the frictional pressure upon the belt serving to transmit motion from the driving-cone 1 to the receiving-cone 2.

6 in the drawings denotes a rigid rod or bar which is secured at its opposite ends to the housings 4 4', such rod extending lengthwise of and practically parallel with the adjacent surfaces of the pulleys.

The belt-shifter is shown in the drawings at 7 as a U-shaped carriage composed of a base or body 8 and right-angular arms 9 9'. The right-angular ends or heads $9^2$ $9^2$ of the arms 9 9' are pierced to receive the rod 6, thereby enabling the carriage to slide freely upon such rod. Each arm 9 9' is recessed, as shown at 10, to receive a cam-lever 11, each lever being pivoted within its recess by a pivot 12. The inner end of each cam-lever 11 is preferably grooved, as shown at 13, to partially embrace the rod 6 and provide considerable bearing-surface, while between the inner and shorter arm of each lever and the bottom of its recess is placed a spring 14, which exerts its stress to crowd the tail or gripping end of each lever tightly against or upon the rod and thereby lock the shifter-carriage immovably upon or to the latter.

The belt 5 is embraced by the arms 9 9' of the carriage 7 and is thereby caused to change its position or be shifted upon the pulleys in response to any change in position of the carriage upon its supporting-rod.

15 in the drawings denotes a cord or its equivalent secured at opposite ends to the tails of the lever 11, respectively, and preferably passing about pulleys 16 16, pivoted to the machine-housings at opposite ends of the rod 6, the body of this cord hanging loosely from the pulleys into a position where an operator at work at a lathe or other machine may readily grasp it without changing his position. As herein shown, this cord is in one piece for the reason, as before stated, that the operator may grasp it without changing his position; but it may be in two pieces, one hanging from each lever.

By means of the above-described arrangement of the pulleys, belt, and shipper it will be seen that when it is desired to shift the belt to increase or diminish the speed of the driven pulley or a counter-shaft the operator will seize the cord in both hands and by pulling upon the same will release both cam-levers and by so doing free the carriage from its hold upon its supporting-rod and permit it to be drawn in one or the other direction, as circumstances require. When the proper speed has been imparted to the driven pulley, the operator releases his hold upon the cord and the cam-levers by the stress of their springs automatically return to their normal positions and grip the rod 6, thereby locking the carriage 7 to such rod.

The purpose of the cord is simply to release the cam-levers and adjust the position of the shifter upon the rod 6. At all other times it is idle.

In lieu of the automatically-closing cam-levers before described for locking the belt-shifter to its supporting-rod a sliding wedge or other mechanical equivalent may be employed. I consider my invention in this respect to consist in the combination, with the pulleys, endless belt, and supporting-rod, of a belt-shifting carriage adapted to freely traverse such rod and provided with means for enabling such carriage to automatically lock itself to the rod. For instance, Fig. 5 of the drawings represents a modification in which twin wedges 18 18 are employed. In this instance each wedge is received within a cell or recess 19, formed in each arm 9' of the carriage, and is crowded inward and upon the rod 6 by means of a spring 20, which exerts its stress between a lateral lip 21 formed upon the inner end of said wedge and an abutment 22 within the recess 19. Each wedge is necessarily parallel with the rod 6, and its outer end or tail is pierced to receive the hand pull-cord.

In Figs. 5 and 6 the part corresponding to that marked 8 in Figs. 1 to 4, inclusive, is marked $8^b$ $8^c$, respectively.

Fig. 6 of the drawings represent a modification which is constructed as follows: The carriage in this instance is composed simply of a block 23, which slides at its base loosely upon the rod 6. 24 24 represent twin levers disposed upon opposite sides of the carriage and which toward their outer ends are pivoted to the carriage by a common pivot 25. Between the outer extremities of the said levers 24 is placed a coiled spring 26, which tends to crowd said extremities apart. The inner end of each lever 24 terminates in a tubular head 27, the bore 28 of which is tapering and increasing in diameter toward its outer end, as shown at 29. The inner end of the bore is but slightly larger than the diameter of the rod 6. The head of each lever is pierced, as shown at 30, to receive the hand-cord. In their normal position the levers 24 are crowded upon the rod 6 by the action of their springs. When the cord is pulled, the head 27 of each lever is released from its grip upon the rod, and when the cord is idle such head automatically grips the rod through the instrumentality of the spring 26.

I claim—

1. The combination, with the pulleys and their supports, and the endless driving-belt gripped and traveling between such pulleys, and serving, by frictional contact, to impart motion from one to the other; of a sliding belt-shifting device, provided with gripping parts and a support on which it slides, whereby, by a pull upon a cord connected with such shifting device, the latter may be first freed from its hold upon its support, and then moved upon the latter, as circumstances require, essentially in manner as hereinbefore set forth.

2. The combination, with the pulleys and their supports, and the endless belt gripped and traveling between such pulleys, and serving by frictional contact to transmit power from one to the other; of a sliding belt-shifting device, provided with gripping parts and a support on which it slides, whereby, by a pull upon a cord connected with such shifting device, the latter may be first freed from its hold upon its support, and then moved upon the latter, as circumstances require; and the cam-levers, for automatically closing said levers upon the support of the shifting device, when the pull upon the cord is released, essentially in manner and for the purposes explained.

3. The combination with the pulleys and their supports, the endless belt gripped by and traveling between such pulleys, and a belt-shifting device operating to automatically grip its support, of a cord connected with such shifting device, and adapted, by a pull upon it, to release the hold of the shifting device upon its support, substantially as explained.

4. The combination with the pulleys and their supports, the endless belt gripped by and traveling between such pulleys, and a belt-shifting device operating to automatically grip its support, of a cord connected with such shifting device and adapted by a pull upon it to first release the hold of said shifting device upon its support, and then to change the position of such shifter upon said support, substantially as described.

5. The combination with the pulleys and the endless belt traveling between and gripped by them, of a belt-shifting device and a suitable support for the same, on which it slides, means for pulling on said device to free and move the same, and means whereby it is automatically locked to its support when free from the control of the operative, substantially as explained.

6. The combination with the pulleys and the endless driving-belt gripped by and traveling between such pulleys, of a belt-shifting device and a suitable support for the same, said shifting device being constructed and operating substantially as hereinbefore described, to automatically lock itself to its support, substantially as explained.

7. The combination with the pulleys and the endless belt gripped by and traveling between such pulleys, of a belt-shifting device and a suitable support for the same, said shifting device being constructed and operating substantially as herein described to automatically lock itself to its support; and a suitable mechanism for effecting such locking, and a hand-cord connected therewith, essentially as herein set forth.

8. The combination with the pulleys and the endless belt gripped by and traveling between them, of the carriage straddling such belt a suitable support upon which said carriage slides, and a device for automatically locking the two together, essentially as explained.

9. The combination with the pulleys and the endless belt gripped by and traveling between them, of the carriage straddling such belt a suitable support, a device for automatically locking the two together, and a hand-cord connected with and operating said locking device, substantially as explained.

10. The combination with the pulleys, and the endless belt traveling between and gripped by them, and the rod for supporting the belt-shifter, of the belt-shifting device consisting of the carriage, with its body inclosing and adapted to slide upon its supporting-rod, its arms or wings to embrace the belt and the spring-impelled cam-levers operating to grip the supporting-rod, and the hand-cord for operating said levers and carriage, substantially as described.

GEORGE F. EVANS.

Witnesses:
FRANCIS L. BULLARD,
FRED G WEBBER.